United States Patent
Iwasaki et al.

(10) Patent No.: US 7,644,793 B2
(45) Date of Patent: Jan. 12, 2010

(54) AUTOMOTIVE HEAT EXCHANGING SYSTEM

(75) Inventors: Mitsuru Iwasaki, Nakano-ku (JP);
Junichiro Hara, Nakano-ku (JP);
Kazunori Namai, Nakano-ku (JP);
Hironori Muramoto, Nakano-ku (JP);
Michitake Sumida, Nakano-ku (JP)

(73) Assignee: Calsonic Kansei Corporation, Saitama-Ken (JP)

( * ) Notice: Subject to any disclaimer, the term of this patent is extended or adjusted under 35 U.S.C. 154(b) by 1079 days.

(21) Appl. No.: 10/694,088

(22) Filed: Oct. 28, 2003

(65) Prior Publication Data
US 2004/0226764 A1 Nov. 18, 2004

(30) Foreign Application Priority Data
Oct. 28, 2002 (JP) .............................. 2002-313095

(51) Int. Cl.
B60K 11/08 (2006.01)
B60K 11/00 (2006.01)
(52) U.S. Cl. .................... 180/68.2; 180/68.1; 180/68.3; 180/68.6
(58) Field of Classification Search ....... 180/68.1–68.4, 180/68.6; 123/41.04, 41.05, 41.06, 41.31, 123/41.12
See application file for complete search history.

(56) References Cited

U.S. PATENT DOCUMENTS

| | | | | |
|---|---|---|---|---|
| 4,356,796 A | * | 11/1982 | Tholen ..................... | 123/41.31 |
| 4,476,820 A | * | 10/1984 | Nixon ...................... | 123/41.05 |
| 4,539,943 A | * | 9/1985 | Tsuchikawa et al. ..... | 123/41.05 |
| 4,546,742 A | * | 10/1985 | Sturges .................... | 123/41.05 |
| 4,756,279 A | * | 7/1988 | Temmesfeld ............. | 123/41.04 |
| 4,779,577 A | * | 10/1988 | Ritter et al. .............. | 123/41.05 |
| 5,090,270 A | * | 2/1992 | Suzuki ....................... | 477/117 |
| 5,188,005 A | * | 2/1993 | Sankpal et al. ............. | 477/102 |
| 5,216,983 A | * | 6/1993 | Nilson ..................... | 123/41.12 |
| 5,383,825 A | * | 1/1995 | El-Khoury et al. .......... | 477/149 |
| 5,566,745 A | * | 10/1996 | Hill et al. .................... | 165/299 |
| 5,845,612 A | * | 12/1998 | Lakerdas et al. ......... | 123/41.44 |
| 5,970,925 A | * | 10/1999 | Lakerdas et al. ......... | 123/41.11 |
| 6,129,056 A | * | 10/2000 | Skeel et al. .............. | 123/41.49 |
| 6,203,287 B1 | * | 3/2001 | Hendrix et al. ............. | 417/313 |
| 6,309,178 B1 | * | 10/2001 | Kim et al. ................... | 415/176 |

* cited by examiner

*Primary Examiner*—S. Joseph Morano
*Assistant Examiner*—Vaughn T Coolman
(74) *Attorney, Agent, or Firm*—Wenderoth, Lind & Ponack, L.L.P.

(57) ABSTRACT

An automotive heat exchanging system has a heat exchanger comprising a condenser and a radiator, an electric fan located in the front of an engine and an automatic transmission. A shroud is attached to and covers peripheral portions of the electric fan and the heat exchanger to prevent air from bypassing the shutter. The shroud forms an air passage inside of it for allowing airflow through the heat exchanger to flow toward the automatic transmission. A shutter is disposed in the shroud and attached at a periphery of the shroud. The shutter is controlled to open and close the air passage by a controller based on oil temperature.

18 Claims, 6 Drawing Sheets

AUTOMOTIVE HEAT EXCHANGING SYSTEM

BACKGROUND OF THE INVENTION

1. Field of the Invention

The present invention relates to an automotive heat exchanging system which is applied to a motor vehicle with an automatic transmission.

2. Description of the Related Art

In general, the automotive heat exchanging system of this kind comprises a radiator mounted in the front of a vehicle, an electric fan located behind the radiator, a shroud covering from a periphery of the radiator to a periphery of the fan and forming an air passage in the shroud for guiding air toward an engine to get rid of excess engine heat, a shutter driven by an actuator and installed in front of the radiator, and a controller which controls the actuator to move the shutter between a full open position and a closed position to adjust an amount of airflow for cooling the engine according to a predetermined condition.

A conventional automotive heat exchanging system constructed as above is disclosed in, for example, Japanese patent laying-open publication Tokkaihei 5-133226. This system further comprises an oil pump to discharge a pressurized oil, a control valve modulating the oil pressure from the oil pump according to heat load of the engine, and an oil motor driven by the oil pressure supplied from the control valve. In this system, the pressure modulated oil is supplied to the oil motor for driving the fan and to the actuator for moving the shutter to change its opening.

Another conventional automotive heat exchanging system constructed as above is disclosed in, for example, Japanese patent laying-open publication Tokkai 2000-130167. This system has two shutters; a first shutter located in front of the area covered by the shroud, and a second shutter located in front of the area uncovered by the shroud. In this system, the second shutter is controlled to close when a vehicle speed is at most a predetermined speed, and the first shutter is controlled to open when a temperature of a coolant in the radiator is at most a predetermined temperature.

Incidentally, the automotive heat exchanging system has a close relationship to fuel consumption of an engine, for it effects cooling and warming up the engine and an automatic transmission.

The engine discharges exhaust gas in the air through an exhaust system including an exhaust pipe, a muffler, and a catalyst converter. The exhaust gas from the engine includes pollutant components, which is reduced by the catalyst converter.

The catalytic converter is activated when its temperature is more than a certain temperature, while its catalytic activity is reduced when it is not. This results in that as the time for engine running at low engine temperature, during a warm-up phase of the engine after engine-starting, becomes longer, it brings more fuel consumption, for a rich fuel-air mixture is supplied to the engine to burn at high temperature and activate the catalytic converter by high temperature gas.

In the automatic transmission, a lock-up clutch is used for engaging an impeller and a turbine of a torque converter to reduce the fuel consumption. Recently, attempts to engage the lock-up clutch at as low a vehicle speed as possible, for example at 40 Km/h, are made for less fuel consumption. The lock-up at low speed, however, sometimes brings unwilled engine stop especially at low automatic transmission oil temperature, for an oil in the automatic transmission has a high viscosity at low temperature.

At present, the lock-up is controlled based on an engine temperature, and disengaged in order to avoid engine stop when an engine temperature is lower than a predetermined engine temperature.

This brings a delay in raising the engine temperature, causing an increase in the fuel consumption. Besides, a delay of lock-up during warm-up after engine-starting is created because the engine temperature and the automatic transmission oil temperature do not always correspond to each other.

This means that it is desirable to prevent air from passing through the radiator and from bypassing the radiator to flow toward the engine and the automatic transmission at low oil temperature after engine-starting.

The above known conventional automotive heat exchanging systems, however, encounter such a problem that they are not sufficient for reducing fuel consumption when an oil temperature of an automatic transmission is low after engine-starting.

In the above mentioned conventional systems, the shutter is located in front of the radiator covered by the shroud, which causes air to bypass the shutter while flowing toward the engine and the automatic transmission to cool them. In addition, in the systems, the shutter is controlled based on the engine temperature, which does not always correspond to the automatic transmission oil temperature, which fails less fuel consumption, because it takes a long time to warm up the automatic transmission oil.

It is, therefore, an object of the present invention to provide an automotive heat exchanging system which can prevent air from flowing through a shroud toward an automatic transmission and from bypassing a shutter and flowing toward the automatic transmission for speeding up an automatic oil temperature to reduce fuel consumption when the oil temperature of the automatic transmission is low.

SUMMARY OF THE INVENTION

According to the first aspect of the present invention, there is provided an automotive heat exchanging system comprising: a heat exchanger mounted in front of an engine and an automatic transmission and supplied with a coolant; an electric fan which is located in a front of the automatic transmission and ensures airflow through the heat exchanger; a shroud attached to and covering peripheral portions of the electric fan and the heart exchanger to form an air passage inside of the shroud for allowing airflow through the heat exchanger to flow toward the automatic transmission; a shutter disposed in and attached at a periphery thereof to the shroud to open and close the air passage; an oil temperature sensor for sensing a temperature of oil in the automatic transmission and for outputting an oil temperature signal; and a controller which controls opening and closing of the shutter based on the oil temperature signal from the oil temperature sensor.

According to a preferred embodiment, the automotive heat exchanging system further comprises an oil warmer which is supplied with the coolant circulating through an engine and the heat exchanger and attached to the automatic transmission to warm the oil in the automatic transmission.

According to another preferred embodiment, the electric fan is located behind the heat exchanger, and the shutter is located between the heat exchanger and the electric fan.

According to a still further preferred embodiment, the electric fan is located behind the heat exchanger, and the shutter is located behind the electric fan.

According to a further preferred embodiment, the electric fan is located in front of the heat exchanger, and the shutter is located behind the shutter.

According to a further preferred embodiment, the controller controls the shutter to open fully for allowing air to pass through the air passage when the oil temperature is more than a predetermined oil temperature.

According to a further preferred embodiment, the heat exchanging system further comprises an engine temperature sensor sensing an engine temperature of the coolant and outputting an engine temperature signal, the controller controlling the shutter to open fully for allowing air to pass through the air passage when the oil temperature is more than a predetermined oil temperature and when the oil temperature is at most a predetermined oil temperature and the engine temperature is more than a predetermined engine temperature.

According to a further preferred embodiment, the heat exchanger includes a radiator, and the controller controls the shutter to open fully when the oil temperature is more than the predetermined oil temperature, and controls the coolant flowing to the radiator to flow to the oil warmer when the engine temperature of the coolant flowing to the radiator is more than the predetermined engine temperature.

According to a further preferred embodiment, the controller controls the shutter to open partially when the oil temperature is at most a predetermined oil temperature, and controls the shutter to open fully when the oil temperature is more than the predetermined oil temperature.

According to a further preferred embodiment, the controller controls the shutter to change opening of the shutter according to at least one predetermined low oil temperature lower than the predetermined oil temperature.

According to a further preferred embodiment, the heat exchanger includes a condenser for air conditioning, and the controller controls the shutter to open regardless of the engine temperature and the oil temperature when an inlet pressure of the condenser is more than a predetermined pressure.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Throughout the following detailed description, similar reference characters and numbers refer to similar elements in all figures of the drawings.

The First Embodiment

Figure 1:
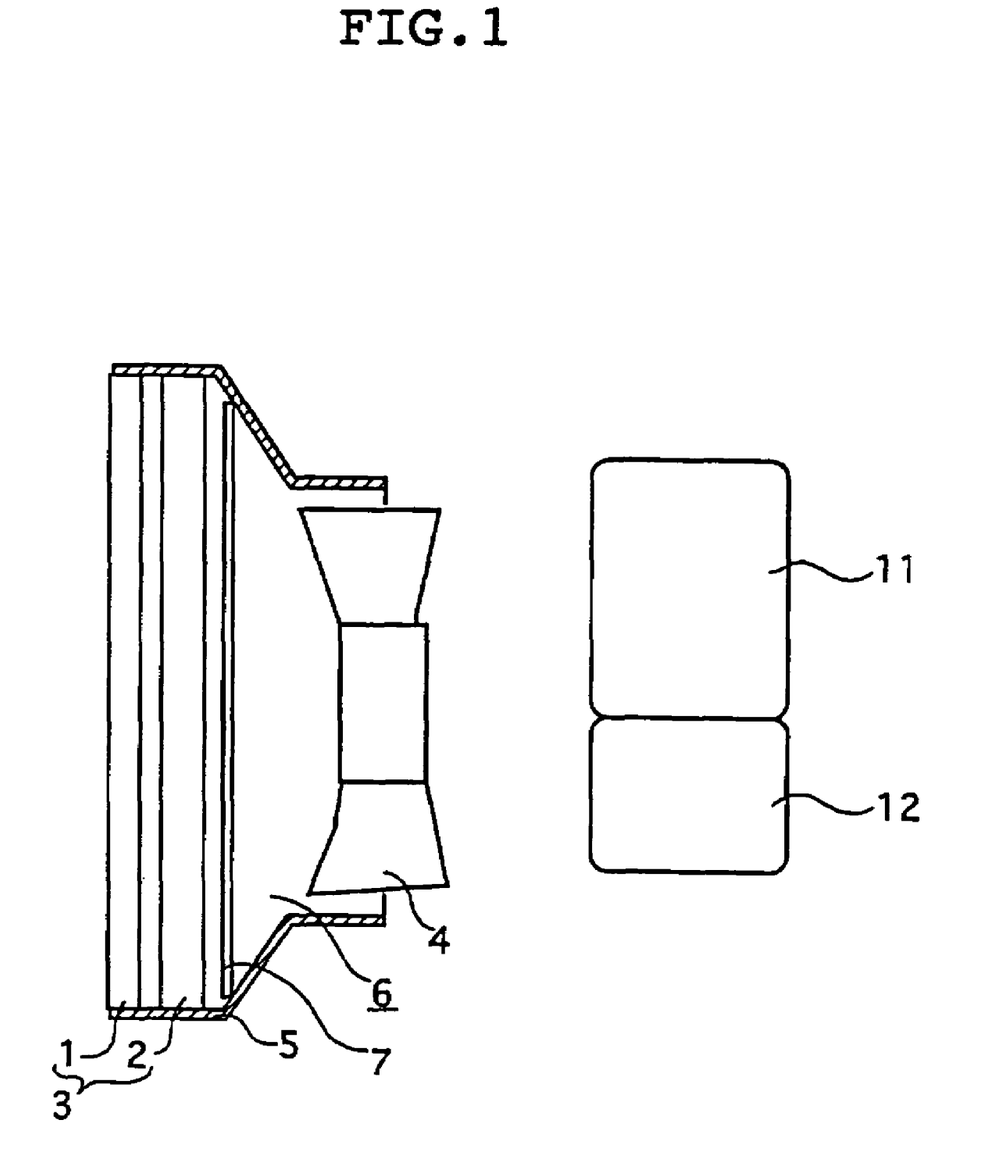
FIG. 1 is a schematic side view showing an arrangement of main parts of an automotive heat exchanging system according to a first embodiment of the present invention, an engine, and an automatic transmission.

Referring to FIG. 1, there is shown a first preferred embodiment of the automotive heat exchanging system according to the present invention.

Referring to FIG. 1, the automotive heat exchanging system has a heat exchanger 3 comprising a condenser 1 for air conditioning, and a radiator 2 through which a coolant, such as water, for cooling an engine circulates. The system also has an electric fan 4 located behind the heat exchanger 3, a shroud 5, extending backward and forward of a vehicle, which is attached to and covers peripheral portions of the condenser 1, the radiator 2, and the electric fan 4 to form an air passage 6 inside of the shroud 5 for air passing through the heat changers 3 and flowing toward only the rear area of the electric fan 4, and a shutter 7 which is disposed in the air passage 6 between the heat exchanger 3 and the electric fan 4 and attached at its periphery to the shroud 5.

Figure 2:
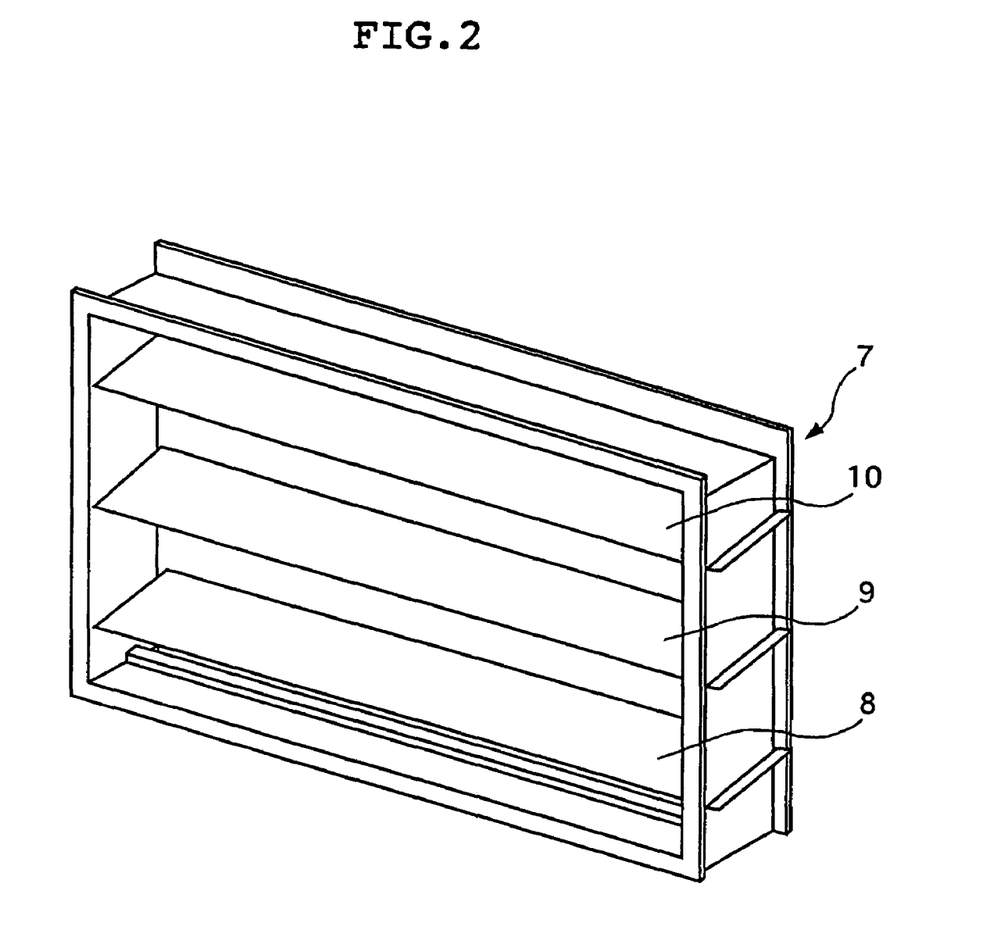
FIG. 2 is a perspective view of a shutter used in the automotive heat exchanging system in FIG. 1.

The shutter 7 is equipped with plural blades 8, 9, and 10 which are driven by an actuator, not shown, to move for opening and closing the air passage 6. Behind the electric fan 4, an engine 11 and an automatic transmission 12 are installed in the vehicle.

In the following, the operation of this automotive heat exchanging system will be described.

When the shutter 7 is opened and the electric fan 4 is driven to rotate, air passing through the heat exchanger 3 from the front area of the vehicle is guided by the shroud 5 to flow in the air passage 6. The air passes through the shutter 7 and is discharged from the air passage 6, flowing toward the rear area of the electric fan 4, which cools the engine 11 and the automatic transmission 12.

When the electric fan 4 is stopped and the shutter 7 is closed by the actuator, the airflow passing through the air passage 6 and flowing toward the engine 11 is substantially halted. In addition, no air bypasses the periphery of the shutter 7, for its peripheral portion is attached the shroud 5 to be sealed. Thus, closing the shutter 7 prevents air in the front of the vehicle from flowing in the air passage 6 and bypassing the shutter 7 to flow toward the engine 11 and the automatic transmission 12 and cooling them, which speeds up the rise of automatic transmission oil temperature. Moreover, the shroud 5 can be constructed in short lengths so that this automotive heat exchanging system can be adapted to a small-sized car.

The Second Embodiment

Figure 3:
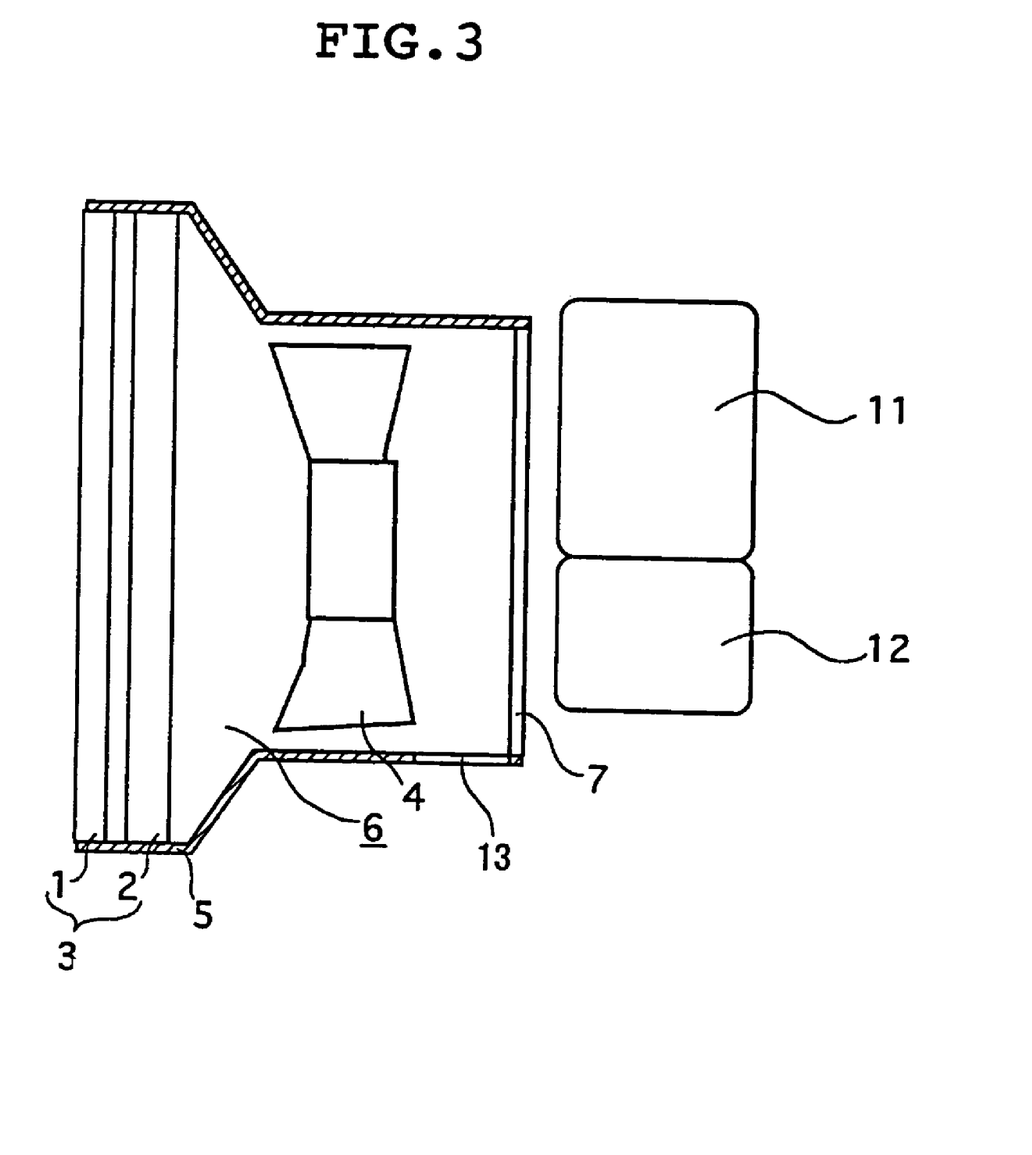
FIG. 3 is a schematic side view showing an arrangement of main parts of an automotive heat exchanging system according to a second embodiment of the present invention, an engine, and an automatic transmission.

FIG. 3 shows an automotive heat exchanging system according to the second embodiment of the present invention.

In this embodiment, a shutter 7 is located behind an electric fan 4, and also in front of and adjacent to an engine 11 and an automatic transmission 12. In addition, a shroud 5 extends from the periphery of a condenser 1 to the periphery of the shutter 7. The shroud 5 is formed with an opening 13 at a lower portion of the shroud 5, which allows communication between the air passage 6 and the external air. In other words, as illustrated in FIG. 3, the shroud has a front end, a rear end, sidewalls connecting the front end and the rear end, and an opening formed in the sidewalls to allow air to flow out of the air passage.

The other parts of the second embodiment are substantially the same as the first embodiment.

In the following, operation of this automotive heat exchanging system will be described.

When closing the shutter 7, ram air generated when a vehicle is cruising or air generated by the driven electric fan 4 flows into the front of air passage 6 and flows out from the opening 13 while heat exchanging with the condenser 1 and a radiator 2 when passing through them. This means that the air passing through the condenser 1 and the radiator 2 does not flow to the rear area of the air passage 6 located in front of the engine 11 and the transmission 12. The air, therefore, fails to cool them. This results in that the coolant temperature of the engine 11 and oil temperature of the automatic transmission 12 go up fast.

Accordingly, air conditioning is available by circulating the coolant through the radiator while driving the electric fan and closing the shutter when warming up the engine 11 and the transmission 12 by closing the shutter 7.

The Third Embodiment

Figure 4:
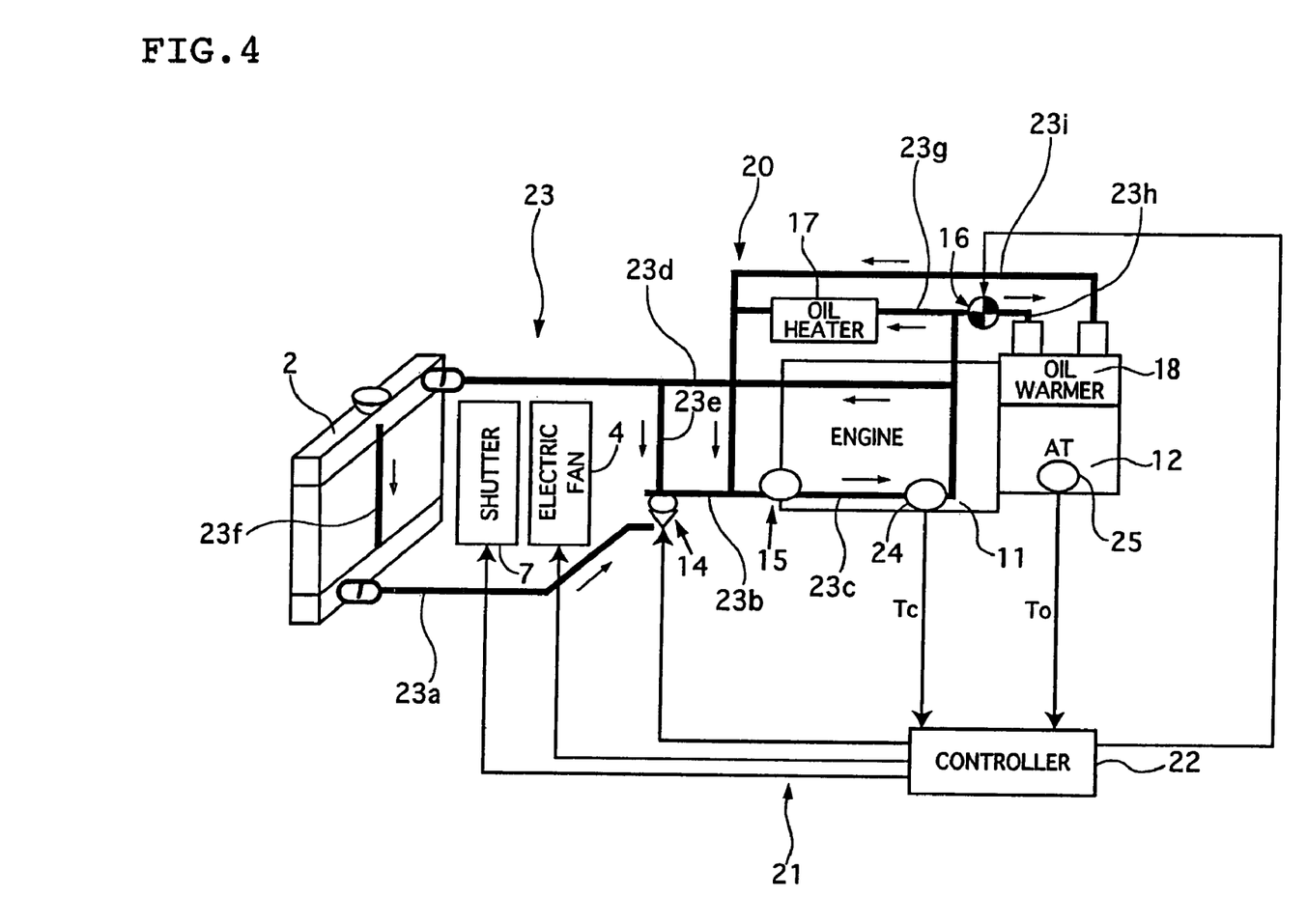
FIG. 4 is a schematic diagram showing fluid and electric circuits applied to the main parts of the automotive heat exchanging system shown in FIGS. 1 and 3 according to a third embodiment of the present invention.

FIG. 4 shows fluid and electric circuits 20 and 21 of an automotive heat exchanging system according to the third embodiment which is applied to the main parts of the heat exchanging systems shown in FIGS. 1 and 3.

The fluid circuit 20 has a thermostat 14 controlled to open and close by a controller 22, a water pump 15 to output a pressurized coolant, a normal-closed type shut-off valve 16, an oil heater 17 with an ON/OFF switch, an oil warmer 18 attached to an automatic transmission 12, and coolant passages 23.

The coolant passages 23 comprise a first passage 23a connecting the outlet port of a radiator 2 and the thermostat 14 with each other, a second passage 23b connecting the thermostat 14 and the water pump 15 with each other, a third passage 23c connecting the water pump 15 and the normal-closed type shut-off valve 16 with each other, a fourth passage 23d connecting the third passage 23c and the inlet port of the radiator 2 with each other, a fifth passage 23e connecting the fourth passage 23d and the second passage 23b with each other, a sixth passage 23f built in the radiator 2 and connecting the inlet port and the outlet port of the radiator 2 with each other, a seventh passage 23g connecting the third passage 23c and the second passage 23b through the oil heater 17 with each other, an eighth passage 23h connecting the shut-off valve 16 and the inlet port of the oil warmer 18 with each other, and a ninth passage 23i connecting the outlet port of the oil warmer 18 and the second passage 23b with each other.

The electric circuit 21 comprises an engine temperature sensor 24 for sensing a coolant temperature TE of an engine 11 and outputting an engine temperature signal, an oil temperature sensor 25 for sensing an oil temperature TO of an automatic transmission 12 and outputting an oil temperature signal, an engine load sensor, not shown, for sensing an engine load LE and outputting an engine load signal, and the controller 22 which controls the electric fan 4, the shutter 7, the thermostat 14, and the shut-off valve 16 based on the inputted signals from the above sensors.

In the following, operation of these circuits 20 and 21 will be described.

When the engine temperature TE is more than a predetermined engine temperature TEP, the thermostat 14 is controlled by the controller 22 to open and connect the first and second passages 23a and 23b with each other. This results in that the coolant circulates through the water pump 15, the radiator 2, and the thermostat 14 to cool the engine 11. The shut-off valve 16 is also controlled by the controller 22 to open and connect the third and seventh passages 23c and 23h with each other to supply the coolant to the oil warmer 18. This results in that the coolant warms the oil in the automatic transmission 12 when the oil temperature TO is low, while the coolant, being at more than about 80° C. and less than the oil temperature TO (for example, about 95° C.), cools the oil when the oil temperature TO is very high, for example, at about 135° C.

When the engine temperature TE is low soon after starting the engine 11, the thermostat 14 is controlled by the controller 22 to close. This results in that the coolant circulates without passing through the radiator 2, while circulating through the oil heater 17 and being heated, which speeds up a rise in the temperature of the vehicle's cabin for air conditioning. When the engine temperature TE rises to some degree, the shut-off valve 16 is controlled by the controller 22 to open and supply the oil warmer 18 with the coolant. The oil warmer 18 directly warms up the oil in the automatic transmission 12, causing its viscosity to become low, and speeds up its oil temperature TO to rise, which reduces fuel consumption.

Incidentally, the above electrically controlled thermostat 14 may be replaced by a mechanically operated one, for example, using a bimetal.

Figure 5:
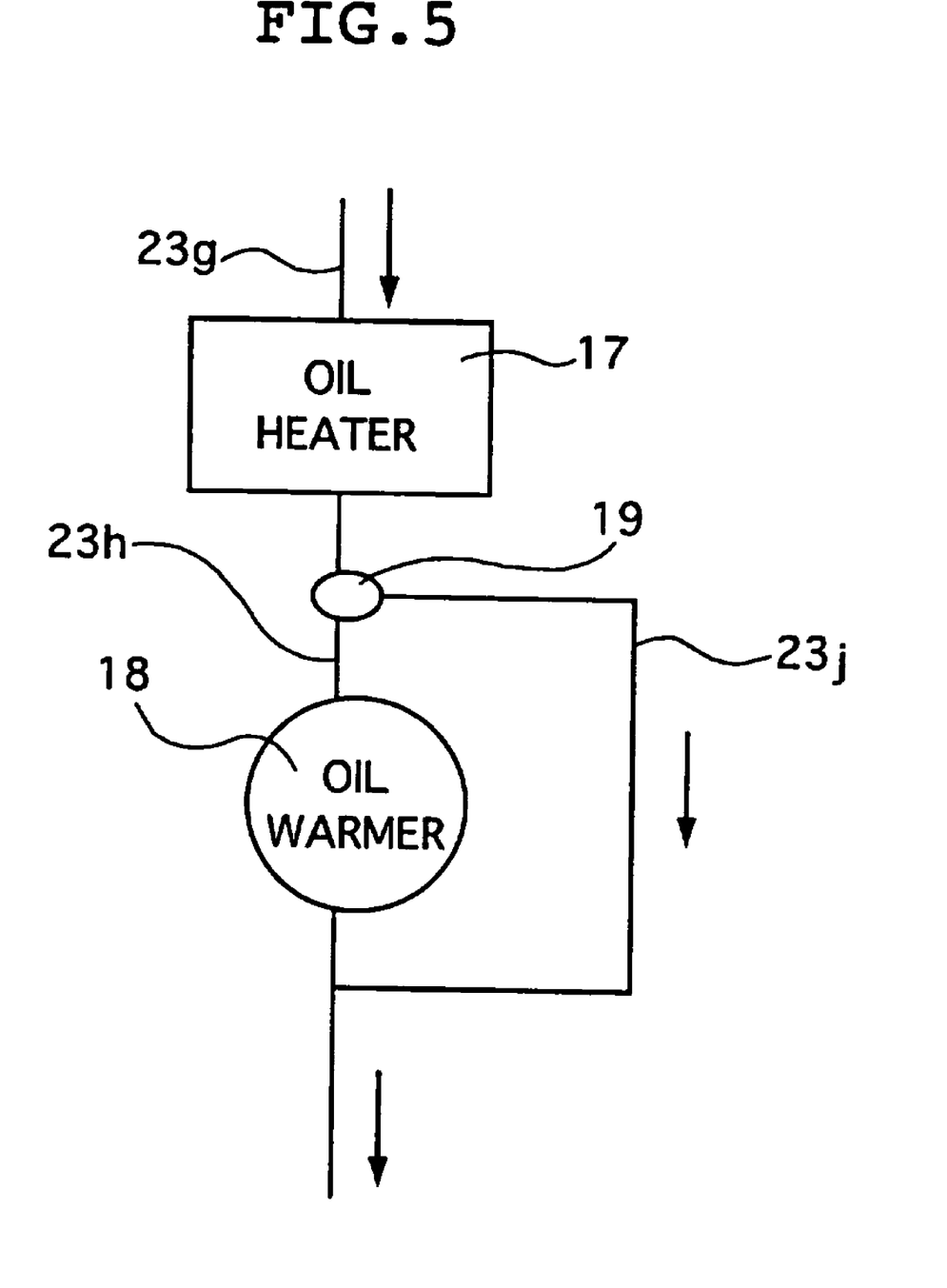
FIG. 5 is a fragmentary schematic diagram showing another arrangement of an oil heater and an oil warmer instead of the fluid circuit shown in FIG. 4.

Instead of a parallel arrangement of the oil heater 17 and the oil warmer 18 with the shut-off valve 16 in the fluid circuit shown in FIG. 4, a parallel arrangement of the oil heater 17 and the oil warmer 18 may be used, as shown in FIG. 5, with a directional control valve 19 disposed in the eighth passage 23h connecting the oil heater 17 and the oil warmer 18 with each other, and a tenth passage 23j bypassing the oil warmer 18 and connecting the directional control valve 19 and an oil warmer's outlet side of the eighth passage 23h.

Figure 6:
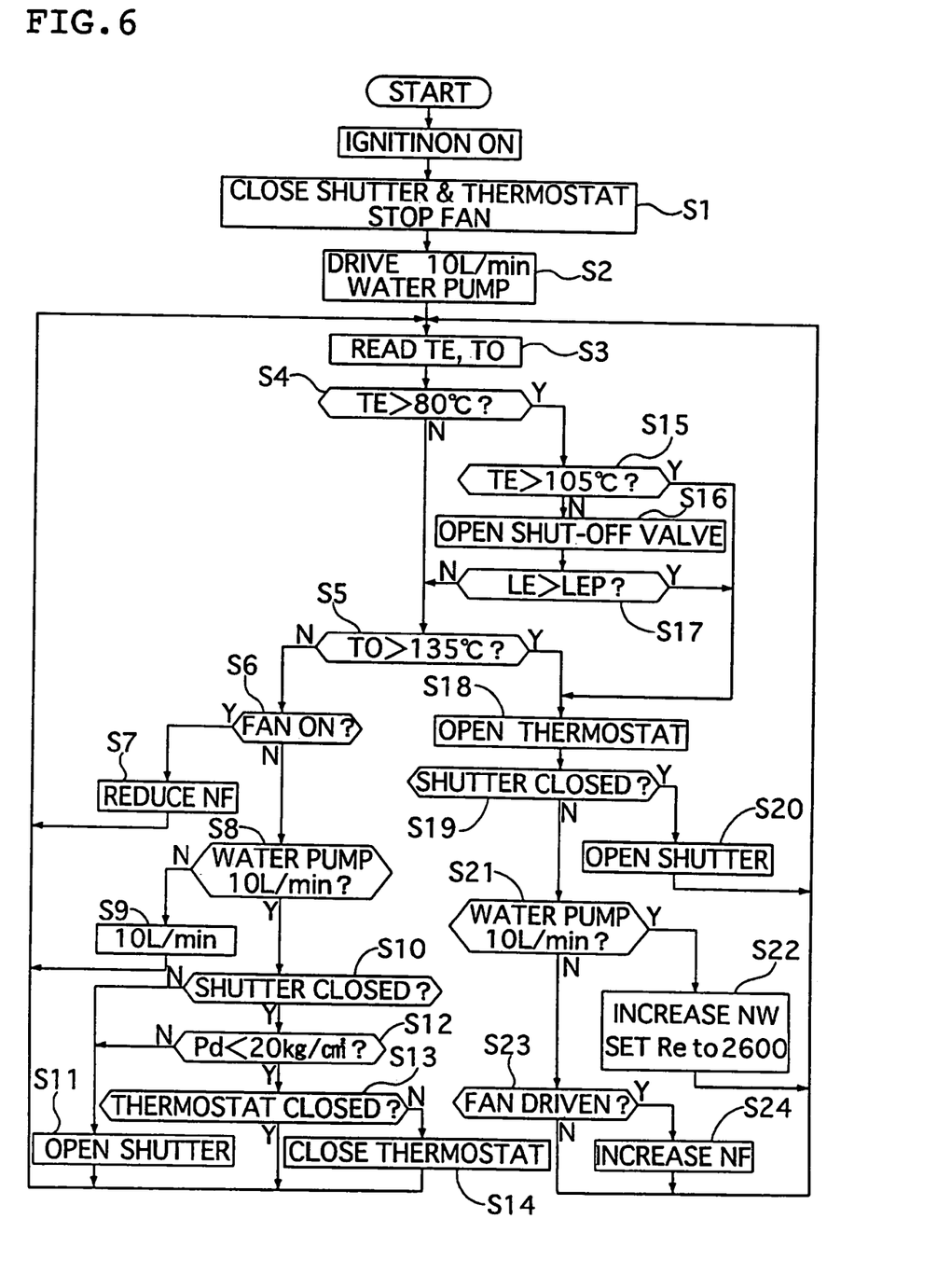
FIG. 6 is a flowchart showing operation steps executed in a controller shown in FIG. 4.

In the following, the operation of the automotive heat exchanging system will be described referring to a flowchart, as shown in FIG. 6, executed in the controller 22.

By turning an ignition key on, the engine 11 begins to run. At step S1, the controller 22 controls the shutter 7 and the thermostat 14 to close, and the electric fan 4 to halt. At step S2, the water pump 15 is driven at a discharging rate of 10 L/min (liters per minute).

At, step S3, the controller 22 reads the engine temperature TE based on the engine temperature signal from the engine temperature sensor 24 and the oil temperature TO based on the oil temperature signal from the oil temperature sensor 25. At step S4 the controller 22 determines whether or not the inputted engine temperature TE is more than TEP, for example 80° C. If NOT, the operation flow goes to step S5, while, if YES, the operation flow goes to step S15.

At step S5, the controller 22 determines whether or not the inputted oil temperature TO is more than a predetermined oil temperature TOP, for example 135° C. IF NOT, the flow goes to step S6, while, if YES, the flow goes to step S18.

At step S6, the controller 22 determines whether or not the electric fan 4 is driven. If YES, the flow goes to step S7, while, if NOT, the flow goes to step S8. At step S7, the rotation speed NF of the electric fan 4 is reduced, and then the flow goes back to step S3.

At step S8, the controller 22 determines whether or not the water pump 15 is driven to discharge the coolant at 10 L/min. If NOT, the flow goes to step S9, while, if YES, the flow goes to step S10. At step S9, the water pump 15 is controlled to drive at 10 L/min, and then the flow goes back to step S3.

At step S10, the controller 22 determines whether or not the shutter is closed. If NOT, the flow goes to step S11, while, if YES, the flow goes to step S12. At step S11, the shutter 7 is opened, and the flow goes back to step S3.

At step S12, the controller 22 determines whether or not a pressure Pd at the inlet port of the condenser 1 is less than 20 Kg/cm$^2$. If NOT, the flow goes to step S11, while, if YES, the flow goes to step S13.

At step S13, the controller 22 determines whether or not the thermostat 14 is closed. If YES, the flow goes back to step S3, while, if NOT, the flow goes to step S14. At step S14, the thermostat 14 is controlled to close, and then the flow goes back to step S3.

On the other hand, when the engine temperature TE is more than 80° C., the flow goes from step S4 to step S15, and the controller 22 determines whether or not the engine temperature TE is more than 105° C. If NOT, the flow goes to step S16, while, if YES, the flow goes to step S18. At step S16, the shut-off valve 16 is controlled to open and supply the oil warmer 18 with the coolant, and then the flow goes to step S17.

At step S17, the controller 22 determines whether or not the engine load LE is more than a predetermined load LEP. If NOT, the flow goes to step S5, while, if YES, the flow goes to step S18. At step S18, the thermostat 14 is controlled to open, and then the flow goes to step S19.

At step S19, the controller 22 determines whether or not the shutter 7 is closed. If YES, the flow goes to step S20, while, if NOT, the flow goes to step S21. At step S20, the shutter is controlled to open, and then the flow goes back to step S3.

At step S21, the controller 22 determines whether or not the water pump 15 is driven to discharge the coolant at 10 L/min. If YES, the flow goes to step S22, while, if NOT, the flow goes to step S23. At step S22, the water pump 15 is controlled to increase its rotation speed NW and adjust the amount of the coolant flowing into the radiator 2 to get the Reynolds Number Re of the coolant to be 2600, and then the flow goes back to step S3.

At step S23, the controller 22 determines whether or not the electric fan 23 is driven. If NOT, the flow goes back to step S3, while, if YES, the flow goes to step S24. At step S24, the electric fan 23 is controlled to increase its rotation speed NF, and then the flows goes back to step S3.

As described above, when the automatic transmission oil temperature TO is equal to or less than 135° C., the shutter 7 is controlled to close and prevent air passing through the heat exchanger 3 from flowing toward the engine 11 and the automatic transmission 12, which speeds up the rise of the engine temperature TE and the automatic transmission oil temperature TO. This results in that when the oil temperature TO is equal to or less than 135° C., as far as the engine 11 is not overheated, warming up the automatic transmission oil, allowing the lock-up clutch to be engaged faster at low vehicle speed. Besides, a shifting time of fuel injection control of the engine 11 from rich fuel-air mixture supply to normal fuel-air mixture supply can be faster. This results in that fuel consumption is Vastly reduced when the automatic transmission temperature is low.

In the above system, the automatic transmission oil temperature TO rises fast by the shutter 7 being fully opened, when the oil temperature TO is more than the predetermined temperature TOP. Besides, the shutter 7 is fully opened in priority regardless of the oil temperature TO when the engine temperature TE is more than TEP, which prevents the engine from being overheated. Because the controller 22 enables the shutter 7 to open partially, the opening of the shutter 7 can be more precisely controllable, and an air conditioning control is available during partial opening of the shutter before full opening.

In the above embodiments, the shutter 7 is controlled to full-open or close, which may be replaced by a shutter controlled to change its opening according to at least one predetermined low oil temperatures, for example two temperatures of 90° C., 110° C., lower than the predetermined oil temperature TOP before step S5.

The controller 22 may control the shutter 7 to open regardless of the engine temperature TE and the oil temperature TO when an inlet pressure of the condenser 1 is more than a predetermined pressure. This results in that a cabin temperature is controlled in priority to keep a person or persons in the vehicle comfortable during engine running.

The electric fan 4 may be located in front of the heat exchanger, and the shutter is located behind the fan, which can adapt the automotive heat exchanging system to a small-sized car, for the shroud 5 is lower in height and shorter in length than the shutter 7 and the heat exchanger 3.

The entire contents of Japanese Patent Application 2002-313095 (filed Oct. 28, 2002) are incorporated herein by reference.

The present embodiments are to be considered in all respects as illustrative and not restrictive, and all changes which come within the meaning and range of equivalency of the claims are therefore intended to be embraced therein. The invention may be embodied in other specific forms without departing from the spirit or essential characteristics thereof.

What is claimed is:

1. An automotive heat exchanging system comprising:
a heat exchanger mounted at a front of an engine and an automatic transmission and to be supplied with a coolant;
an electric fan located at the front of said automatic transmission and operable to ensure airflow through said heat exchanger;
a shroud attached to and covering peripheral portions of said electric fan and said heat exchanger to form an air passage inside of said shroud for allowing airflow through said heat exchanger to flow toward said automatic transmission;
a shutter arranged in said shroud and having a periphery attached to said shroud, said shutter being operable to open and close said air passage;
an automatic transmission oil temperature sensor for sensing a temperature of oil in said automatic transmission and for outputting an automatic transmission oil temperature signal; and
a controller for controlling opening and closing of said shutter based on the automatic transmission oil temperature signal received from said automatic transmission oil temperature sensor so as to control the temperature of the oil in said automatic transmission.

2. The automotive heat exchanging system of claim 1, further comprising an oil warmer arranged to be supplied with the coolant circulating through said engine and said heat exchanger, said oil warmer being attached to said automatic transmission to warm the oil in said automatic transmission.

3. The automotive heat exchanging system of claim 1, wherein said electric fan is located at a rear of said heat exchanger, and said shutter is located between said heat exchanger and said electric fan.

4. The automotive heat exchanging system of claim 1, wherein said electric fan is located at a rear of said heat exchanger, and said shutter is located at a rear of said electric fan.

5. The automotive heat exchanging system of claim 1, wherein said electric fan is located at a front of said heat exchanger, and said shutter is located at a rear of said electric fan.

6. The automotive heat exchanging system of claim 1, wherein said controller is operable to fully open said shutter for allowing air to pass through said air passage when the automatic transmission oil temperature is more than a predetermined oil temperature.

7. The automotive heat exchanging system of claim 6, wherein said controller is operable to partially open said shutter when the automatic transmission oil temperature is no more than the predetermined oil temperature, and to fully open said shutter when the automatic transmission oil temperature is more than the predetermined oil temperature.

8. The automotive heat exchanging system of claim 6, wherein said heat exchanger includes a condenser for air conditioning, and said controller is operable to open said shutter regardless of the engine temperature and the automatic transmission oil temperature when an inlet pressure of said condenser is more than a predetermined pressure.

9. The automotive heat exchanging system of claim 6, further comprising an engine temperature sensor sensing an engine temperature of the coolant and outputting an engine temperature signal, said controller operable to fully open said shutter for allowing air to pass through said air passage when the automatic transmission oil temperature is more than a predetermined oil temperature and when the automatic transmission oil temperature is no more than the predetermined oil temperature and said engine temperature is more than a predetermined engine temperature.

10. The automotive heat exchanging system of claim 9, wherein said controller is operable to partially open said shutter when the automatic transmission oil temperature is no more than the predetermined oil temperature, and to fully open said shutter when the automatic transmission oil temperature is more than the predetermined oil temperature.

11. The automotive heat exchanging system of claim 9, wherein said heat exchanger includes a condenser for air conditioning, and said controller is operable to open said shutter regardless of the engine temperature and the automatic transmission oil temperature when an inlet pressure of said condenser is more than a predetermined pressure.

12. The automotive heat exchanging system of claim 2, wherein said heat exchanger includes a radiator, and said controller is operable to fully open said shutter when the automatic transmission oil temperature is more than the predetermined oil temperature, and to direct a flow of the coolant flowing to said radiator to said oil warmer when the engine temperature of the coolant flowing to said radiator is more than the predetermined engine temperature.

13. The automotive heat exchanging system of claim 12, wherein said controller is operable to partially open said shutter when the automatic transmission oil temperature is no more than the predetermined oil temperature, and to fully open said shutter when the automatic transmission oil temperature is more than the predetermined oil temperature.

14. The automotive heat exchanging system of claim 13, wherein said controller is operable to change an opening amount of said shutter according to at least one predetermined low oil temperature lower than the predetermined oil temperature.

15. The automotive heat exchanging system of claim 13, wherein said heat exchanger includes a condenser for air conditioning, and said controller is operable to open said shutter regardless of the engine temperature and the automatic transmission oil temperature when an inlet pressure of said condenser is more than a predetermined pressure.

16. The automotive heat exchanging system of claim 1, wherein said heat exchanger includes a condenser for air conditioning, and said controller is operable to open said shutter regardless of the engine temperature and the automatic transmission oil temperature when an inlet pressure of said condenser is more than a predetermined pressure.

17. The automotive heat exchanging system of claim 1, wherein said heat exchanger comprises a condenser and a radiator at a rear of said condenser.

18. The automotive heat exchanging system of claim 1, wherein said shroud has a front end, a rear end, sidewalls connecting said front end and said rear end, and an opening formed in said sidewalls to allow air to flow out of said air passage inside of said shroud.

* * * * *